Oct. 30, 1934.  
E. C. VON PRITZELWITZ VAN DER HORST  
1,978,558  
AUTOMATIC WEIGHING MACHINE  
Filed June 30, 1932  5 Sheets-Sheet 1

Oct. 30, 1934.  E. C. VON PRITZELWITZ VAN DER HORST  1,978,558
AUTOMATIC WEIGHING MACHINE
Filed June 30, 1932   5 Sheets-Sheet 3

E. C. Von P. Van Der Horst
INVENTOR

By: Marks & Clerk
Attys.

Oct. 30, 1934.  E. C. VON PRITZELWITZ VAN DER HORST  1,978,558
AUTOMATIC WEIGHING MACHINE
Filed June 30, 1932   5 Sheets-Sheet 4

E. C. Von P. Van Der Horst
INVENTOR

By: Marks & Clerk

Oct. 30, 1934.

E. C. VON PRITZELWITZ VAN DER HORST 1,978,558

AUTOMATIC WEIGHING MACHINE

Filed June 30, 1932     5 Sheets-Sheet 5

E. C. Von P. Van Der Horst
INVENTOR

By: Marks & Clerk
Attys.

Patented Oct. 30, 1934

1,978,558

UNITED STATES PATENT OFFICE 1,978,558

AUTOMATIC WEIGHING MACHINE

Ernst C. von Pritzelwitz van der Horst, Pasoeroean, Java, Dutch East Indies

Application June 30, 1932, Serial No. 620,238 In the Netherlands July 4, 1931

10 Claims. (Cl. 249—3)

This invention relates to an automatic weighing machine for weighing materials, which are of such a consistency that the amount remaining in the scale is not always the same, for instance fluids of relatively high viscosity. This residual quantity results in inaccurate weighing, unless special provision has been made in the construction of the weighing machine for preventing it.

With this object in view various suggestions have been put forward, which however do not of themselves enable the operator to be sure of the correctness of the weight of the weighed off quantities, as either with an appliance operating in the normal manner the scale beam does not balance in its position of equilibrium or the appliance is entirely without a scale beam suitable for checking purposes. In the former case it is necessary to interrupt the normal operation of the appliance by external intervention, completely to release the scale beam, to check the correctness of the ascertained weight and, if required, to adjust the appliance. In the second case one or more weighed charges must be caught in a vessel standing on a separate weight-checking machine and reweighed.

The object of the invention is to enable each normal weighing operation in the appliance to take place under conditions which are otherwise only possible when making check weighings, that is to say, with the inflow and outflow of the fluid cut off and with the scale beam balancing quite freely in the horizontal position. With a more accurate check as regards the continued accuracy of the operation of the appliance it is then possible to do without special check weighings and special apparatus for this purpose.

Figure 1:
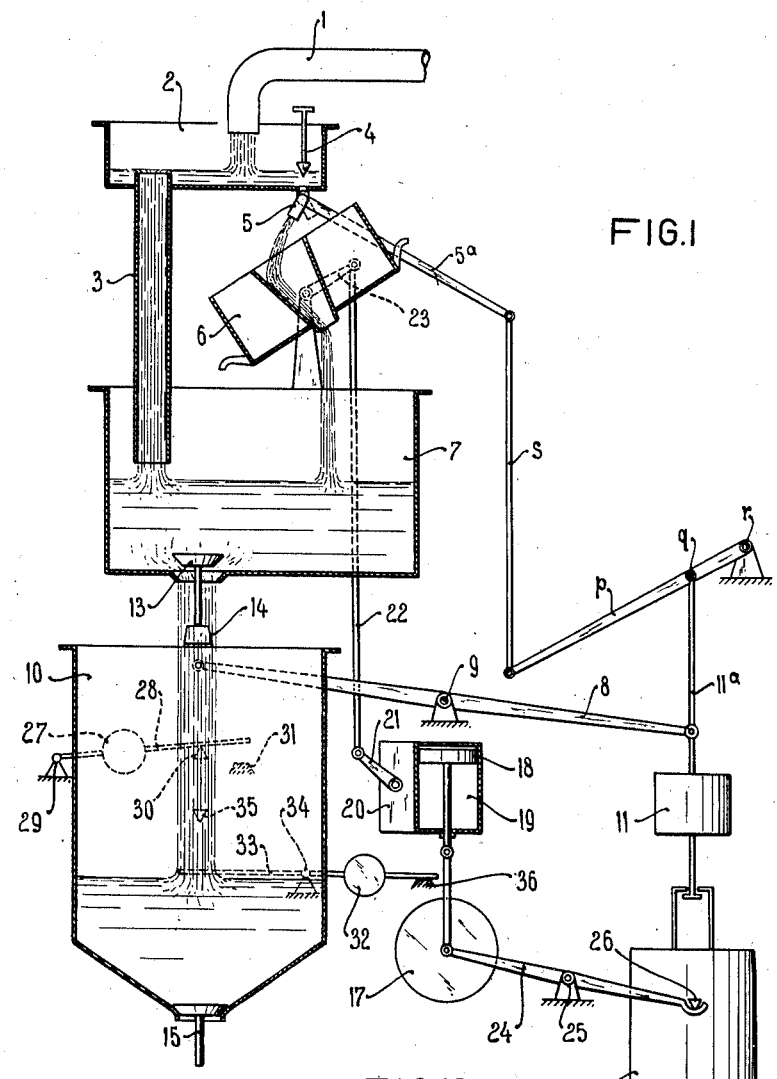
Figure 2:
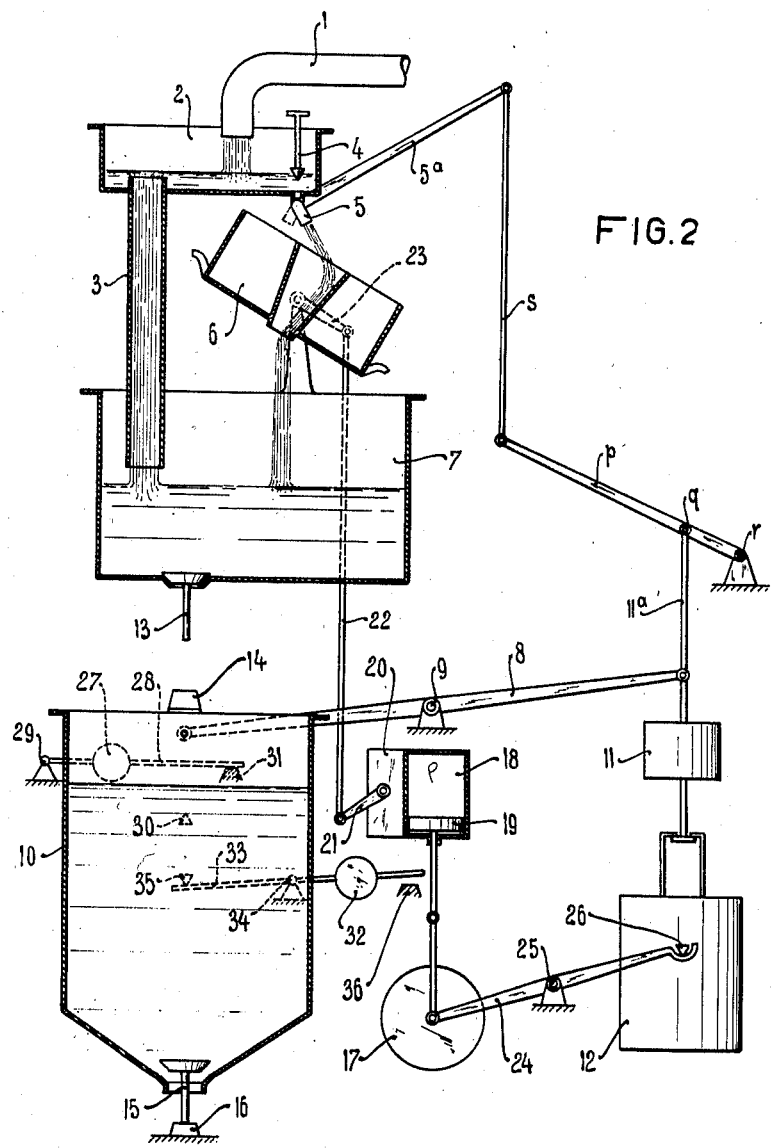
Figure 3:
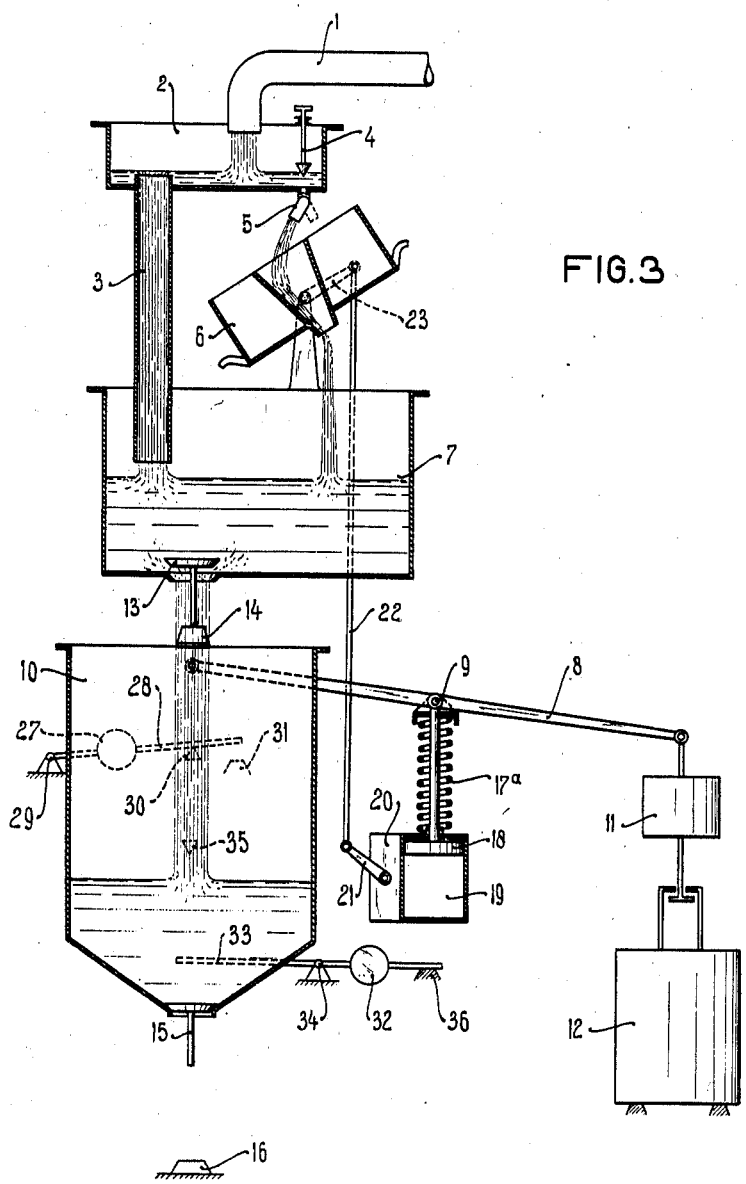
Figure 4:
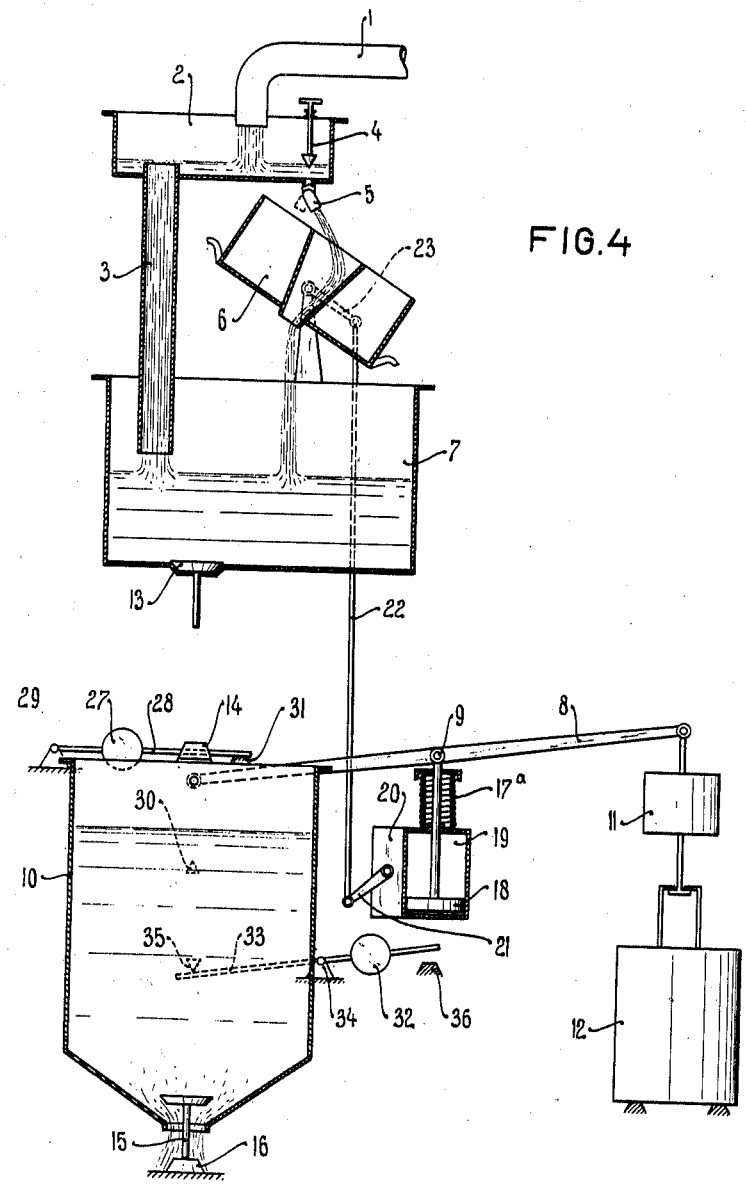
Figure 5:
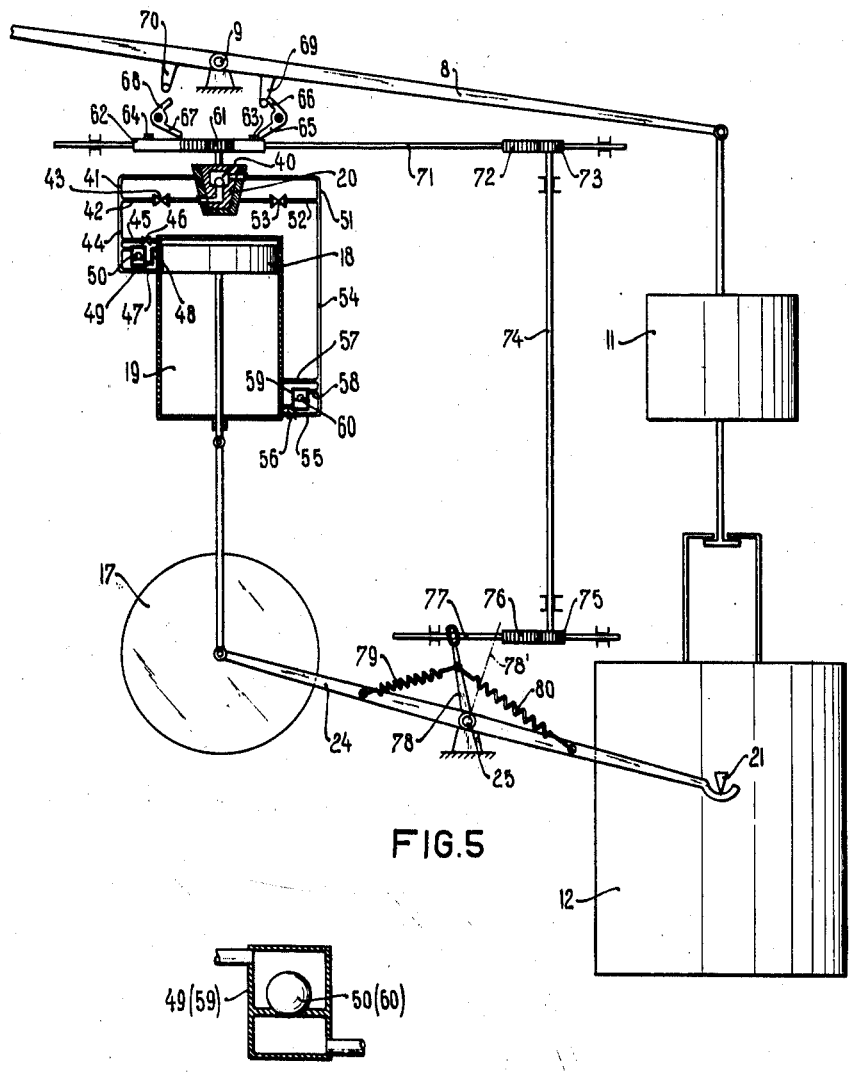
Figure 6:
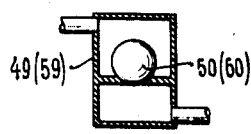

In the accompanying diagrammatic drawings Figs. 1 and 2 illustrate a constructional form of the weighing machine according to the invention in the position shortly after the commencement of the admission and shortly after the commencement of the emptying, respectively, Fig. 1ᵃ is an enlarged sectional view of the valve forming part of the hydraulic control device, Figs. 3 and 4 illustrate a second construction form of the weighing machine, the latter being shown in two positions, Fig. 5 shows a modified form of the construction according to Figs. 1 and 2, Fig. 6 is an enlarged detail section of one of the check valves of the construction shown in Fig. 5.

The fluid to be weighed flows from the supply pipe 1 into a distributing vessel 2, the greater part flowing from the latter through a pipe 3 and the smaller part, which is regulable by means of a shut-off valve 4, through a pivoted pipe 5 and a tilting vessel 6 into a reservoir 7. From one end of the main scale beam 8, which is pivoted at 9, is suspended the weighing vessel 10 and from the other end the tare weight 11, to which the net weight 12 is removably attached.

13 is the filling valve which is adapted to be opened by a push member 14 fixed to the weighing vessel. 15 is the emptying valve which, on the weighing vessel descending, is raised by a fixed push member 16.

17 is a counter-poise of about half the weight of the net weight 12. Its speed of motion is controlled by a piston 18 which slides in a brake cylinder 19. The latter is provided with a cock 20 and is filled with an imcompressible liquid, preferably oil. The cock 20 is connected through a lever 21, a rod 22 and a lever 23 with the tilting vessel 6. The counterpoise 17 is adapted to exert an upwardly directed pressure by means of an auxiliary scale beam 24 pivoted on a fixed fulcrum 25 on the knife edges 26 fixed to the net weight 12.

27 and 32 are movable weights which can slide on levers 28 and 33 respectively. The levers are pivoted on fixed fulcrums 29 and 34 respectively and when in the position of rest bear against fixed stops 31 and 36 respectively, from which they can be lifted by knife edges 30 and 35 respectively fixed to the weighing vessel 10.

The machine operates as follows:

When in the position shown in Fig. 1 almost the required amount has flowed into the weighing vessel, the latter commences to descend and the filling valve 13 descends with it. At the same time the tare weight 11 and the net weight 12 are raised, so that the latter is lifted off the scale beam 24, as the cock 20 in the position shown (see Fig. 1ᵃ) prevents the piston 18 from sinking. Immediately after the downward motion of the weighing vessel has commenced, the pivoted pipe 5 is rocked over into the position shown in broken lines in Fig. 1, by the scale beam 8, through an extension 11ᵃ pivotally connected at q to an arm p pivoted at r and connected through a link s with an arm 5ᵃ connected with the pipe 5, so that the flow of fluid out of the pipe 5 commences to fill the right-hand compartment of the tilting vessel 6. The valve 13 thereupon closes, the arrangement being such that, by a suitable selection of the pressure acting on the push member 14 of the valve, exactly the desired weight of fluid in the vessel 10 is reached and the scale beam 8 balances horizontally.

In the meantime the right-hand compartment of the tilting vessel 6 will have filled to such an extent that this vessel will tilt over into the position shown in Fig. 2, causing the valve 20 to change over and permit the flow of fluid from the space below the piston 18 to the space thereover, which enables the piston 18 to sink slowly under the influence of the counterpoise 17. When the auxiliary scale beam 24 is about in its middle position the right-hand end of this beam will bear against the knife edges 26 of the net weight 12, raising the latter. The downward motion of the piston 18 continues until it has reached its lowest position (Fig. 2). Owing to the lifting of the net weight 12 the weighing vessel will have reached its bottom position and the valve 15 will have been opened by the push member 16, causing the vessel to commence emptying.

The tare weight 11 is heavier than the weighing vessel, so that towards the end of the emptying operation the weighing vessel commences to rise while it still contains a certain amount of fluid. Through this upward motion of the weighing vessel the lift of the emptying valve 15 is reduced and the net weight 12 is completely supported by the right-hand end of the auxiliary scale beam 24. The scale beam 24 is prevented from turning as the cock 20, in the position shown, prevents the piston 18 from rising. Consequently the connection between the tare weight and the net weight is released and only the tare weight is still suspended to the main scale beam 8.

Immediately after the upward motion of the weighing vessel has commenced, the pivoted pipe 5 is swung over by means of the gear referred to above, by the main scale beam 8 into the position shown in Fig. 2 in broken lines, so that the flow of fluid from the pipe 5 commences to fill the left-hand compartment of the tilting vessel 6. Shortly afterwards the valve 15 closes, the pressure exerted on the push member 16 being made such that exactly the desired quantity of fluid remains in the vessel 10 and the main scale beam 8 after continued downward motion of the tare weight 11 balances in the horizontal position.

In the meantime the left-hand compartment of the tilting vessel 6 will have been filled to such an extent that the latter tilts over into the position shown in Fig. 1, changing over the cock 20 so that the piston 18 is enabled to move slowly upwards under the influence of the weight of 12 acting on the auxiliary scale beam 24, which is greater than that of 17. When the piston has reached its top position the arrangement will again be in the position shown in Fig. 1 and a fresh filling will commence.

It is a characteristic feature of the arrangement that both after the filling and after the emptying of the weighing vessel there is a period which is regulable by means of the valve 4 and during which the fluid neither flows into nor out of the weighing vessel, and that during this period the main scale beam 8 is given the opportunity of balancing perfectly freely in the horizontal position. The main scale beam 8 and the parts suspended therefrom are during this period entirely out of contact with any mechanism, for instance that for reversing the cock, which might interfere with the accuracy of the weighing. On the other hand the oscillations of the main scale beam about the position of equilibrium may be damped by an air or fluid resistance which of course does not influence the accuracy of the position of rest.

In other automatic weighing machines the free balancing of the scale beam in the position of equilibrium when the valves are closed takes place either only during a special checking weighing operation, the scale beam having to be released by the operator, or not at all, in which case one or more charges have to be separately weighed for checking the weight. The advantage of this balancing of the scale beam resides in the increased accuracy and also in the fact that the operator is given an opportunity of satisfying himself as to the correct functioning of the machine by simply observing the balancing of the scale beam when the weighing vessel is full and when it is empty, without carrying out any separate check weighing.

During the filling of the weighing vessel 10 as illustrated in Fig. 3, the spring 17a interposed between the brake cylinder 19 and the pivot 9 of the scale beam 8 is relieved from the pressure of the said beam, since the cock 20 prevents the piston 18 from descending.

When the filling of the vessel 10 is completed, the scale beam 8 moves into its middle position and the net weight 12 is lifted off its support. After the said beam has balanced horizontally during a short period with a view to checking the correct weight, the cock 20 is changed over in the manner stated above, owing to which the piston 18 and the scale beam 8 with the parts suspended therefrom move slowly downwards. During this downward motion, the net weight 12 first again seats itself upon its support, and on further descending motion of the scale beam 8 the outlet valve 15 is opened, so that the vessel 10 begins to discharge, as shown in Fig. 4. In the meantime, the spring 17a has been compressed and since piston 18 is prevented from rising with the cock 20 in its new position, said spring cannot expand. After the weighing vessel has discharged its contents, the scale beam 8 returns into its horizontal position, wherein the correct tare weight can be checked. Thereafter, cock 20 is again changed over by the action of the tilting vessel 6, thus allowing the spring 17a to expand and to raise the pivot 9 of the scale beam 8 into the position illustrated in Fig. 3, when the vessel 10 can again be filled and the cycle of operations is completed.

Inside of the tilting vessel 6 for changing over the cock 20 after the elapse of a certain period following the filling and emptying of the weighing vessel, it is possible to cause the source of energy to become operative immediately after the filling or the emptying of the weighing vessel, in which case the period of time required for the balancing of the main scale beam is obtained by the effect of the source of energy being at first so strongly damped that the part which is actuated by the said source and the function of which is to raise or lower the net weight at first moves more slowly than the scale beam.

When the source of energy coacts with a reversible hydraulic brake as in the constructional example shown in Figs. 1 and 2, the initial strong damping can be obtained by connecting the casing of the change-over cock to the ends of the braking cylinder each by a pipe having a narrow preferably regulable cross-sectional area, and to points of the braking cylinder lying at some distance from the said ends each by a pipe of larger cross-sectional area. This constructional form is shown also diagrammatically in Fig. 5 of the drawings.

The main scale beam 8 with its fulcrum 9, the tare weight 11 with the net weight 12, the counterpoise 17, the brake piston 18, the brake cylinder 19 and the change-over cock 20 agree with the corresponding parts of the arrangement shown in Figs. 1 and 2. The cock plug 20 contains besides the change-over passages a ball valve 40 which allows the braking fluid to pass through in one definite direction only. The cock casing is connected by pipes 41 and 42 (the latter provided with a stop cock 43) to a pipe 44, which is itself connected by a narrow branch pipe 45 having a throttle valve 46, a second branch pipe 47 and a branch pipe 48 of intermediate cross-sectional area lying between the two, at different heights to the upper part of the brake cylinder 19.

In the branch pipe 48 is a valve casing 49 containing a ball valve 50. The parts 51 . . . 60 connect the cock casing in a similar manner to the lower end of the brake cylinder.

The cock casing 20 is provided with a pinion 61 which meshes with a rack 62. The latter has two projections 63, 64, which coact with bell cranks 65, 66 and 67, 68 respectively, which are adapted to be rocked over by fingers 69 and 70 fixed to the main scale beam 8. The rack 62 is connected by a bar 71 to a rack 72 which meshes with a pinion 73. The latter is mounted on a spindle 74 having a pinion 75 which meshes with a rack 76. The latter is coupled by a bar 77 with a lever arm 78 which is pivoted on the fulcrum 25 of the auxiliary scale beam 24 and is connected to the latter by springs 79, 80.

The arrangement just described operates as follows:

With the parts in the position shown in which the weighing vessel is to be regarded as being suspended from the left hand end of the main scale beam 8, and as being filled in its highest position, the tare weight 11 is entirely supported by the weighing vessel, while the net weight 12 is supported to an increasing extent by the weighing vessel and to a decreasing extent by the auxiliary scale beam 24. The latter occupies the position shown, in which the spring 79 is stressed in compression and the spring 80 is unloaded, so that the lever arm 78 seeks to move to the right into the position 78' shown in broken lines, in which the two springs 79, 80 are equally stressed, that is to say, the lever arm 78 is at right angles to the auxiliary scale beam 24. This motion to the right is, however, prevented through the lever arm 78 being coupled by the racks 76 and 72 with the rack 62, which is locked by the bell cranks 65, 66.

At the end of the filling operation the auxiliary scale beam 24 is completely relieved of the net weight 12 which is now raised by the filled weighing vessel. The auxiliary scale beam 24 can in the first instance not take part in this motion under the influence of the counterpoise 17, as the brake piston 18 cannot descend owing to the action of the ball valve 40 with the cock 20 in the position shown. As soon, however, as the main scale beam 8 commences to move, the bell crank 65 is rocked over by the finger 69. The rack 62 is thereby released and moves together with the racks 72 and 76 to the right under the action of the springs 79, 80, until the lever arm 78 reaches the position 78', when the bell crank 67 snaps behind the projection 64, so that the rack 62 cannot again move to the left when, on the auxiliary scale beam 42 rocking over, the spring 80 is stressed in compression.

The rack 62 in moving to the right will have turned the pinion 61 and with it the cock 20 through 180°. By this means the connection between the pipes 42 and 51 is interrupted, while that of the pipes 52 and 41 is established by way of the ball valve 40, so that the brake fluid, for instance oil, below the piston 18 can escape through the pipes 56, 57, 58, 54, 52 and flow in over the piston through the pipes 41, 45. As the pipe 45 with the throttle valve 46 has only a narrow cross-section of flow, the piston 18 can descend only very slowly until it has uncovered the wider passage 47. The passage 48 is kept closed by the ball valve 50. During this period the main scale beam 8 has time to move into its middle position and balance there. When the relatively wide passage 47 has been uncovered by the piston 18, the latter can descend with greater velocity, the auxiliary scale beam 24 following this motion. When the latter has reached its middle position it again engages with the net weight 12, so that the latter is raised under the action of the counterpoise 17 and the main scale beam 8 is rocked over further.

When the relatively rapidly sinking piston has shut off the passage 57, its further motion would be determined by the very narrow cross-sectional area of flow of the pipe 55 and therefore correspond to the initial very slow downward motion, if the branch pipe 58 were not provided. The pipe 58, however, admits of a further downward motion at a medium velocity until this passage is also shut off by the piston. The small remainder of the piston stroke therefore takes place just as slowly as the first greater part of the stroke.

Simultaneously with the piston 18 the weighing vessel reaches its lowest position, in which it empties itself. During the emptying operation the loading of the auxiliary scale beam 24 by the net weight 12 increases gradually, as this scale beam together with the piston 18 is locked in its bottom position by the action of the ball valve 40 which prevents the return flow of the braking fluid. This locked state continues as long as the rack 62 and with it the cock 20 is locked by the bell crank 67, that is to say until the main scale beam 8 returns into the middle position and by means of the finger 70 releases the locking crank 67. After the weighing vessel has been emptied down to the tare weight the same motions are repeated as during the filling operation, but in the reverse sense.

The motion of the cock plug 20 can of course be effected in various ways. The diagrammatically shown constructional example is given only for the purpose of explaining the action. The essential feature is that the hydraulic brake is reversed shortly after the main scale beam has commenced its motion towards the middle position.

What I claim is:—

1. An automatic weighing machine comprising a scale beam, a weighing vessel connected with one end of said beam, a tare weight directly connected with the other end of said beam, a net weight connected with and having limited movement relatively to the second mentioned end of said beam, an inlet device for the weighing vessel operated when the latter is in its uppermost position, the increasing weight of the vessel at the end of the filling operation acting to move said vessel and the beam to an intermediate position and to close said inlet means and the filled vessel being freely balanced by said tare and net weights, control means operating when said beam is in its intermediate balanced position to relieve said beam of the influence of the net weight and thereby permit the weighing vessel by over-balancing the tare weight to descend to its lower position, an outlet device for the weighing vessel operated when the latter is substantially in its lower position, said vessel being returned, following the emptying operation and the closing of the outlet means, and being freely balanced in its intermediate position by said tare weight, said control means acting thereafter to apply said net weight to said beam whereby both said weights are held suspended from said beam acting to return the weighing vessel to its uppermost position.

2. An automatic weighing machine as claimed in claim 1 characterized in that said control means is constituted in part by a hydraulic brake device provided with a change-over member.

3. An automatic weighing machine as claimed in claim 1 characterized in that said control means includes a movable fulcrum for said beam, and means for retaining said fulcrum in its alternate positions.

4. An automatic weighing machine as claimed in claim 1 characterized in that said control means includes a movable fulcrum for said beam, and a hydraulic brake device for retaining said fulcrum in its alternate positions.

5. An automatic weighing machine as claimed in claim 1 characterized by the provision of regulating weights, and means coacting with said regulating weights to influence the scale beam only when the latter moves towards its intermediate position.

6. An automatic weighing machine as claimed in claim 1 characterized in that said control means includes a movable member operated to produce a lifting influence on the net weight, and means for retarding the initial movement of said member to permit the beam to move freely to and freely balance in its intermediate position under the influence of the filled weighing vessel.

7. An automatic weighing machine as claimed in claim 1 characterized in that said control means includes a hydraulic brake device and a change-over valve, said brake device coacting with a movable member having a lifting influence on the net weight, and means for variably controlling the flow of fluid through the hydraulic brake device to retard the initial movement of said member and permit the beam to freely move to its intermediate position under the influence of the filled vessel.

8. An automatic weighing machine as claimed in claim 1, characterized in that said control means includes a hydraulic brake cylinder, a piston therein, a change-over valve and a plurality of pipes connecting said valve with each end of said cylinder, the pipes at each end of the cylinder communicating therewith at various points in the length of the latter, the pipes communicating with the outermost points of the cylinder being of smaller diameter than those communicating with the intermediate portions thereof.

9. An automatic weighing machine as claimed in claim 1, characterized in that said control means includes a hydraulic brake cylinder, a piston therein, a change-over valve and a plurality of pipes connecting said valve with each end of said cylinder, the pipes at each end of the cylinder communicating therewith at various points in the length of the latter, the pipes communicating with the outermost points of the cylinder being of smaller diameter than those communicating with the intermediate portions thereof and certain of said pipes having non-return valves therein, permitting the brake fluid to flow outwardly from said cylinder.

10. An automatic weighing machine as claimed in claim 1 characterized in that said control means includes a hydraulic brake cylinder, a piston therein and a change-over valve connected with said cylinder, a member actuated by said piston and coacting with said net weight, means to actuate said change-over valve, and means actuated by said beam to control the operation of the valve actuating means.

ERNST C. von PRITZELWITZ van der HORST.